United States Patent [19]

Paolucci

[11] Patent Number: 4,665,683

[45] Date of Patent: May 19, 1987

[54] LEAF CUTTING ATTACHMENT FOR ROTARY LAWN MOWER

[76] Inventor: Patrick Paolucci, 75 W. 38th St., Bayonne, N.J. 07002

[21] Appl. No.: 859,024

[22] Filed: May 2, 1986

[51] Int. Cl.⁴ .......................................... A01D 53/08
[52] U.S. Cl. .................................. 56/16.9; 56/17.5; 56/320.1
[58] Field of Search ..................... 56/16.7, 16.8, 16.9, 56/17.3, 17.4, 17.5, 13.3, 13.4, 12.9, 320.1, 320.2, 295

[56] References Cited

U.S. PATENT DOCUMENTS

| | | | |
|---|---|---|---|
| 3,400,523 | 9/1968 | Klingofstrom | 56/13.4 |
| 3,759,023 | 9/1973 | Comer | 56/17.4 |
| 4,277,937 | 7/1981 | Luick | 56/17.4 |

Primary Examiner—Gene Mancene
Assistant Examiner—John G. Weiss
Attorney, Agent, or Firm—Brumbaugh, Graves, Donohue & Raymond

[57] ABSTRACT

A rotary lawn mower attachment facilitating distribution and collection of leaves including a deflector device mounted in fixed position relative to the deck, the deflector including a flexible barrier surrounding the mower outside the annular wall enclosing the cutter blade and extending continuously from the surface of the ground to an elevation above the deck to define a leaf-collecting space intermediate the deflector and annular wall.

2 Claims, 3 Drawing Figures

LEAF CUTTING ATTACHMENT FOR ROTARY LAWN MOWER

BACKGROUND OF THE INVENTION

This invention relates to improvements in rotary lawn mowers, and, more particularly, to an attachment for rotary lawn mowers which facilitates the destruction and collection of leaves during the lawn mowing operation.

Removal of leaves from lawns presents a serious problem for home owners and gardeners who have responsibility for maintaining lawns. Most often, the leaf-raking operation is separate from the lawn cutting, and it is advantageous to combine them in one operation. Certain types of mowers reduce the leaves to a very small size and evenly distribute them on the lawn, while others are designed to entrain the leaves in moving air streams together with grass clippings, and to collect both for removal in bags, bins, or other suitable means. In order for these devices to function, it is necessary to run the mower over the leaves on the lawn. With the exception of recently developed and very expensive models that are designed to create a high vacuum, most mowers project air both into and out of the under side of the mower, with the result that passage of the mower over the lawn causes movement of leaves in a direction away from the mower. While not all leaves escape, those that do are sufficient in number to require a separate raking operation or several passes of the mower over the lawn to do a complete job.

A large number of devices are available in the prior art which are designed to improve the operation of rotary type lawn mowers. One such device is shown in U.S. Pat. No. Re. 31,930 to Luick, which describes means by which the mower can be converted to a vacuum sweeper by adding an adjustable skirt of preferably flexible material at the lower edge of the peripheral wall defining the grass-cutting chamber. While this device is suitable for cleaning dirt and debris from level areas such as sidewalks and paved driveways, it does not provide sufficient clearance to enable a moving mower to ride over and capture dry leaves which occur all too frequently on lawns in the fall of the year.

Another patent of interest is U.S. Pat. No. 3,029,533. The device of this patent provides means for modifying a rotary lawn mower so that it acts as a snow-blowing device. Modifications include provision of disc type wheels to break up snow under the mower, replacement of the grass cutting blade by a snow-blowing flinger, and the provision of a skirt on the bottom of the mower housing.

Another disclosure, that of U.S. Pat. No. 3,400,523 provides means for separately pressurizing the interior of the lawn mower housing to cause the frame to rise relative to the ground. In this case, a flexible rubber skirt is provided under the lawn mower housing to restrict the exit of air from the periphery of the motor housing thus forcing most of the air through the discharge passage to improve the collection of debris from under the mower. Sufficient air continues to escape from under the mower, however, to cause the above-described problem with leaves being pushed away from the mower.

It is also known to provide guards or shields depending either from the front or rear of a rotary type lawn mower to prevent or retard accidents caused by placing ones foot under the mower or by objects such as stones which may be flung from the mower during its operation. Patents which disclose such devices include U.S. Pat. Nos. 3,226,920, 3,727,386 and 4,241,567. None of these prior art references, however, are seen to address the problem caused by the escape of air laterally from under the mower housing which action causes movement of leaves and other debris in a direction away from the mower while the mower is moving over the lawn. This unwanted action requires substantial additional work to complete the raking and cutting of a lawn in the fall of the year.

SUMMARY OF THE INVENTION

The present invention provides an attachment for a rotary lawn mower which substantially surrounds the complete mower and deflects the stream of air which would otherwise tend to cause movement of leaves and other debris away from the mower. This attachment comprises a barrier of flexible material extending continuously from the surface of the ground to an elevation above the deck and includes a frame or other means for retaining the flexible barrier in position relative to the mower during movement of the mower. By using the device of the present invention, the mower can be used to capture leaves by merely passing it over the leaves on the lawn. The leaves then get caught in the space between the deflector and mower housing where a vortex of air occurs which sweeps the leaves under the leading edge of the housing and into the grass cutting chamber where the leaves are broken up and carried away, either to be discharged to the side through an appropriate chute or carried to the bagging device used to collect the grass clippings.

DRAWINGS

Figure 1:
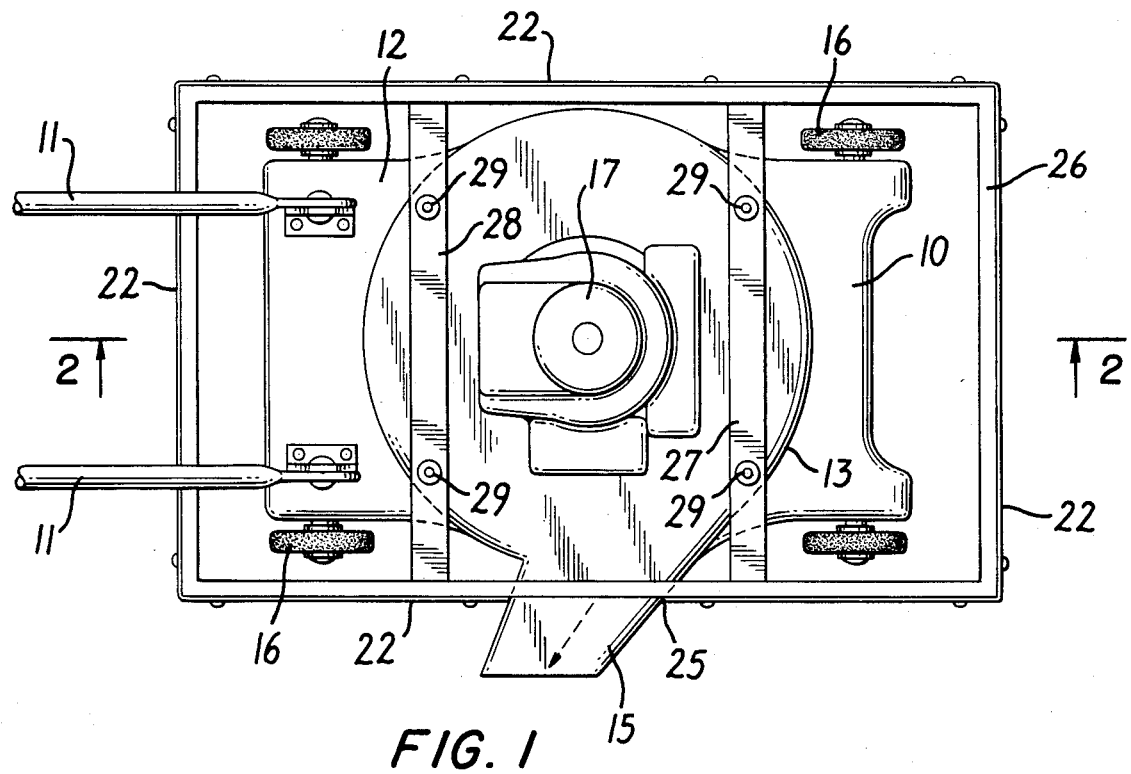
FIG. 1 is a top view of a mower on which a deflector of the present invention has been installed.
Figure 2:
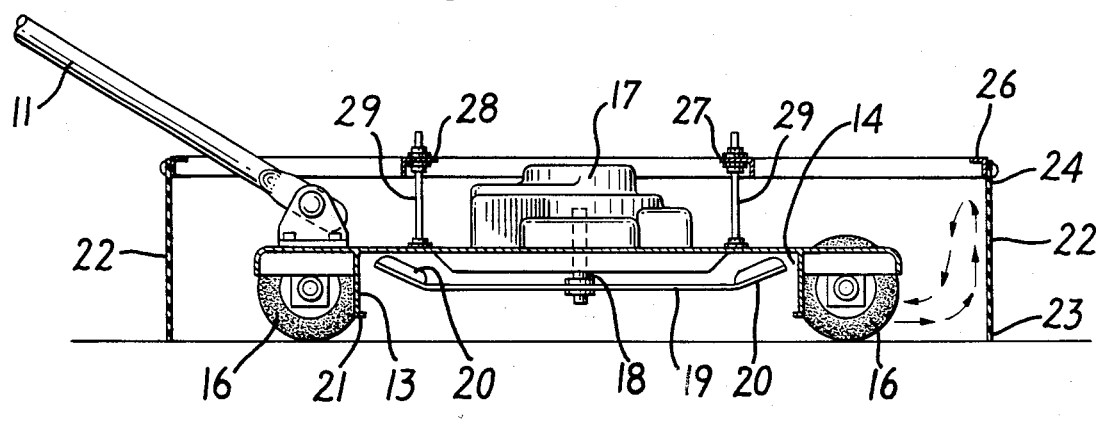
FIG. 2 is a cross-sectional view of FIG. 1 taken along the lines 2—2, looking in direction of the arrows.
Figure 3:
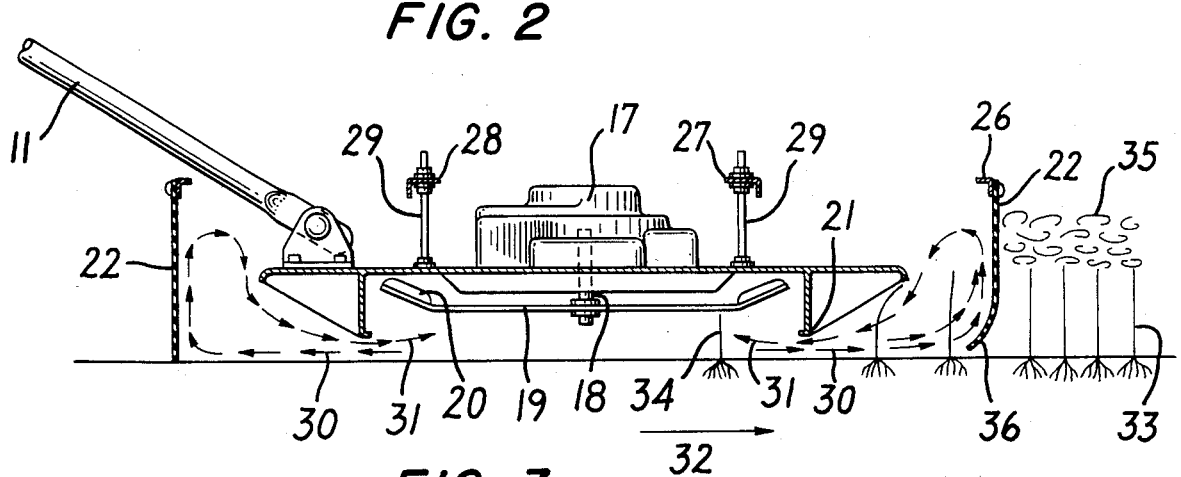
FIG. 3 is a cross-sectional view of FIG. 1 in which some of the structure has been omitted and arrows representing air flow superimposed.

Referring to each of FIGS. 1, 2 and 3, a rotary mower 10 having a handle 11 attached to a deck 12 is shown. Depending from deck 12 is a peripheral wall 13 defining a grass cutting chamber 14. The peripheral wall 13 provides for a discharge chute 15 as shown in FIG. 1.

The mower 10 is supported by four ground-engaging wheels 16 which may be supported by any of several conventional means. Mounted on deck 12 is a motor 17, which may be either electric or gasoline powered, and which is fitted with a shaft 18.

A cutting blade 19 is disposed in grass cutting chamber 14 and is attached to shaft 18 for rotation in a conventional manner. The cutting blade 19 is provided with upwardly turned ends 20 which operate to draw air from beneath the lower edge 21 of depending annular member 13. All of the structure described heretofor is conventional in rotary lawn mowers.

The deflector attachment of the present invention comprises a flexible barrier 22 which may be fabricated of a flexible vinyl sheet. The barrier 22 extends from the ground as shown at 23 in FIG. 2 to a point above the elevation of the deck as shown at 24 in FIG. 2. Except for a cut-out portion at 25 to permit passage of the chute 15, the flexible barrier surrounds the mower and is of generally rectangular shape. Flexible barrier 22 is supported and depends from a frame 26 of rectangular configuration fabricated of any suitable material and which preferably includes at least two cross members 27 and 28. The barrier 22 and frame 26 are affixed to the mower 10 by means of suitable posts 29 which are removably attached to the bed 12 and to the support members 27 and 28. At least four posts are shown, although more can be supplied to increase rigidity of the attachment, if desired. The posts 29 are removably attached to the mower so that the deflector attachment can be removed and stored until such time as the lawn has leaves and requires the use of the attachment.

FIG. 3 shows by diagramatic representation the mode of action of the deflector attachment of the present invention. Rotation of the cutting bar 19 with attached members 20 causes air to flow both outwardly as represented at the arrows at 30 and inwardly as represented by the arrows 31. Forward movement of the mower, as in the direction of the arrow 32, in the absence of deflector 22, causes movement of the leaves and grass shown at 33 in a direction away from the mower. Thus, those leaves directly in the path of the mower will be either pushed forward or to one side and will not pass under the lip 21 of the mower and be subjected to the action of the cutting bar 19. In practice, the leaves move both to the right and to the left of the mower. The grass, being attached by roots to the ground, becomes upright again after passing under the lip 21, and assisted by the upward flow of air caused by the rotation of the cutting bar 19 stands straight and is clipped in the manner shown at 34.

With the deflector 22 in place, however, the leaves immediately in front of the mower during travel, as at 35, remain undisturbed by the air streams 30 because of their deflection upwardly on contact with deflector 22. Forward movement of the mower brings the leaves 35 under the deflector 22 which moves inwardly because of its flexibility as shown at 36. Once inside the confines of the area surrounded by deflector 22, the leaves are carried by the air currents under the lip 21 of the mower, are fragmented by contact with cutting bar 19 and are carried by the air currents in grass cutting chamber 14 to the discharge chute 15.

I claim:

1. In a rotary lawn mower having a deck, a motor on the deck, the motor having a drive shaft extending through the deck, a cutter blade on the shaft, a generally annular wall extending downwardly from the deck and having a lower edge, the wall substantially enclosing the cutter blade and forming a grass cutting chamber, and means for creating substantial movement of air in a direction inwardly of the annular wall adjacent the lower edge thereof, while at the same time creating an area of air movement extending outwardly from the said lower edge of the annular wall to cause movement of leaves and debris in a direction away from the mower on movement of the mower over the lawn, the improvement comprising the provision of a deflector device substantially surrounding the mower outside of the annular wall and spaced apart outwardly therefrom to define a space for collecting leaves and sweeping them under the annular wall and into the grass cutting chamber, the deflector device comprising a flexible barrier extending continuously from the surface of the ground to an elevation above the deck, and means for retaining the flexible barrier in fixed position relative to the mower deck, the deflector being adopted to intercept and deflect all streams of air projected outwardly from the lower edge of the annular wall of the mower and which, if not deflected, would cause leaves and other debris to be repelled from and escape the action of the cutting chamber.

2. The mower of claim 1, wherein the means for retaining the deflector device in position relative to the mower comprises a frame removably mounted on the mower, the frame supporting the flexible barrier so that it substantially completely surrounds the mower and extends from the ground to an elevation above that of the deck.

* * * * *